United States Patent [19]
Okada et al.

[11] Patent Number: 5,748,514
[45] Date of Patent: May 5, 1998

[54] FORWARD AND INVERSE DISCRETE COSINE TRANSFORM CIRCUITS

[75] Inventors: Shigeyuki Okada, Hashima; Naoki Tanahashi, Gifu; Hayato Nakashima, Gifu-ken, all of Japan

[73] Assignee: Sanyo Electric Co., Ltd., Osaka, Japan

[21] Appl. No.: 564,480

[22] Filed: Nov. 29, 1995

[30]     Foreign Application Priority Data

Nov. 30, 1994 [JP] Japan .................... 6-297350
Mar. 24, 1995 [JP] Japan .................... 7-066474
Oct. 27, 1995 [JP] Japan .................... 7-280926

[51] Int. Cl.$^6$ .................................. G06F 17/14
[52] U.S. Cl. .................... 364/725.03; 364/725.02
[58] Field of Search ............... 364/724.01, 725, 364/726, 727

[56]         References Cited

U.S. PATENT DOCUMENTS 5,216,516  6/1993  Tanaka et al. .............. 358/426
5,394,349  2/1995  Eddy ........................ 364/725
5,590,066 12/1996  Oaki ........................ 364/725

OTHER PUBLICATIONS

K.R. Rao and P. Yip, "Discrete Cosine Transform Algorithms, Advantages, Applications", Sep. 1990, Academic Press, Inc., pp. 57–102.

*Primary Examiner*—Chuong Dinh Ngo
*Attorney, Agent, or Firm*—Sheridan Ross P.C.

[57]         ABSTRACT

Discrete cosine transform circuits suitable for inverse discrete cosine transform (IDCT) or forward discrete cosine transform (FDCT) are disclosed. An IDCT circuit includes a group of multipliers and a group of adders/subtracters. The multipliers receive plural pieces of input data which are externally supplied in parallel. Each multiplier has a cosine constant to multiply to the received input data. The adders/subtracters receive multiplication results from the multipliers and perform addition/subtraction thereon to produce output data, which is the result of inverse discrete cosine transform of the input data. An FDCT circuit includes a group of input-stage adders/subtracters, a group of multipliers, and a group of output-stage adders. The input-stage adders/subtracters perform addition/subtraction on input data which are externally supplied in parallel. Computation results of the input-stage adders/subtracters is supplied to the multipliers. The output-stage adders receive multiplication results from the multipliers and produce output data, which is the result of forward discrete cosine transform of the input data. The discrete cosine transform circuits are particularly suitable for use in MPEG video encoders/decoders.

27 Claims, 11 Drawing Sheets

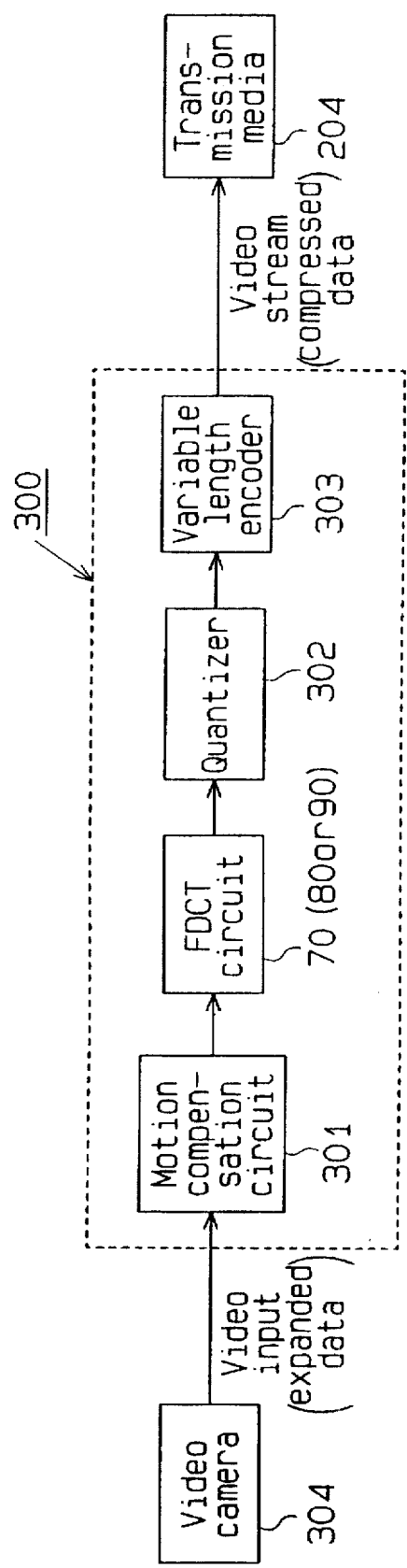

FORWARD AND INVERSE DISCRETE COSINE TRANSFORM CIRCUITS

BACKGROUND OF THE INVENTION

1. Field of the Invention

The present invention relates to discrete cosine transform circuits, and more particularly, to a forward discrete cosine transform and an inverse discrete cosine transform circuit. These transform circuits are particularly suited for use in an MPEG video encoder and an MPEG video decoder.

2. Description of the Related Art

Fast processing of a vast amount of multifarious information is needed to realize multimedia systems. The need for faster information processing has been accomplished by developments in data compression and expansion techniques that directly effect processing speed. Many types of multimedia recording formats in fact utilize data compression and expansion to enhance processing speeds. The "MPEG (Moving Picture Expert Group)" standards are one popular type of standard that defines and governs data compression and expansion techniques. Current MPEG standards are continuing to be established by the MPEG Committee (ISO/IEC JTC1/SC29/WG11) under the ISO (International Organization for Standardization)/IEC (International Electrotechnical Commission).

The MPEG consists of three parts. In part 1 (ISO/IEC IS 11172-1), the MPEG defines a "system" or way of synchronizing and multiplexing the video and audio data. In part 2, (ISO/IEC IS 11172-2), the MPEG defines video standards that govern the format and encoding process for video data and govern decoding process for a video bitstream. In part 3 (ISO/IEC IS 11172-3), the MPEG defines audio standards that govern the format and encoding process for audio data and govern decoding process for an audio bitstream.

At present, there are two MPEG standards, MPEG-1 and MPEG-2, which differ from each other principally in the rate which video and audio data are encoded. The MPEG-1 standard is associated mainly with storage media such as a CD-ROM, and the MPEG 2 standard is associated with a variety of applications including the MPEG-1.

The technical cores described in the MPEG video part are motion compensated prediction (MC) and discrete cosine transform (DCT). The encoding technique which combines the MC and DCT is called a hybrid encoding technique.

Image processing for forming a screen which is to be handled by the MPEG video part, correlates horizontal direction and vertical direction with either one of the horizontal and vertical coordinates of one point (one pixel) on the screen. More specifically, the screen is divided into a plurality of small blocks each including a total of N×N pixels, N pixels in the horizontal direction and N pixels in the vertical direction. Two-dimensional DCT is to be performed on each small block having such N×N pixels. One pixel corresponds to one element in the DCT.

As the value of N gets larger, the encoding efficiency gets better, but the amount of necessary operations increases. That is, the encoding efficiency and the amount of operations are in a tradeoff relation. In the MPEG video part, therefore, N often takes a value of around eight to balance the encoding efficiency with the amount of operations. Basically, the DCT is the signal conversion which, like a Fourier transform, breaks a time signal up into frequency-based signal components. A Fourier transform includes complex number computations where a real-number part and an imaginary-number part are separated. However, one can say that the DCT, in a sense, is a computation to extract only a real-number part from a complex number.

According to the MPEG video part, at the time of encoding, an image signal associated with the formation of a screen is broken by a forward DCT (FDCT) into frequency-based signal components which in turn will be processed. At the time of decoding, frequency-based signal components are restored to an image signal by an inverse DCT (IDCT).

When two-dimensional DCT computation is conventionally executed according to the transform equation, the number of operations becomes significantly large, thus requiring large-scale hardware. To perform the two-dimensional DCT computation on N×N pixels or elements when N=8, for example, 4096 multiplications and 4096 additions are needed. To reduce the number of operations, therefore, it has been proposed to execute much simpler one-dimensional DCT instead of two-dimensional DCT.

More specifically, first, one-dimensional DCT of N elements is performed on N lines in the horizontal direction and then, one-dimensional DCT of N elements is performed on N lines in the vertical direction. This process is equivalent to the execution of two-dimensional DCT of N×N elements. When N=8, one-dimensional DCT requires eight multiplications and eight additions for one element and 64 multiplications and 64 additions for one line. When one-dimensional DCT is performed twice, therefore, the required numbers of multiplications and additions respectively become 16 times greater than those needed in the single execution of one-dimensional DCT, i.e., 1024 multiplications and 1024 additions are needed. This requirement applies to IDCT as well as FDCT.

To increase the speed of the operations for two-dimensional DCT, it is important to not only replace two-dimensional DCT with one-dimensional DCT but also to reduce the number of operations for one-dimensional DCT. In this respect, schemes called "fast algorithms" which simplifies the operations have been proposed. Specifically, when a DCT equation is mathematically developed, one can see several multiplication terms where cosine coefficients to be multipliers become the same. In the fast algorithms, the multiplications having a common cosine coefficient are handled collectively in order to reduce the number of multiplications. The "butterfly operation" is one of such fast algorithms. The conventional MPEG video encoders and MPEG video decoders generally employ this butterfly operation.

When N=8, one-dimensional DCT which uses the butterfly operation requires 16 multiplications and 26 additions for one line. When one-dimensional DCT is performed twice instead of the two-dimensional DCT, the required numbers of multiplications and additions respectively become 16 times greater than those needed in the single execution of one-dimensional DCT, as discussed above so that the DCT based on the butterfly operation just requires 256 multiplications and 416 additions. This requirement applies to IDCT as well as FDCT. The fast algorithm is described in greater detail in "Discrete Cosine Transform Algorithms, Advantages, Applications" by K. R. Rao and P. Yip, ACADEMIC PRESS, INC. 1990.

Even if the operations are simplified by using the fast algorithm, the direct execution of two-dimensional DCT operations involves a significant number of operations and requires large-scale hardware. When N=8, for example, the simple execution of the butterfly operation needs the hardware which includes 256 multiplexers and 416 adders.

Generally speaking, it is very difficult or impossible to integrate such numerous operation circuits on a single chip LSI. Even if there are 1000 gates per a single multiplier, a total of over 200,000 gates would be needed for the multipliers for all the operation circuits. The same is true of IDCT as well as FDCT. FIGS. 1A, 1B, 2A and 2B illustrate operation circuits. Each of the operation circuits includes a function block for the operation of one-dimensional DCT and accomplishes the equivalent two-dimensional DCT operation by repeating the function block. Each function block for the one-dimensional DCT operations is smaller than the hardware which directly executes two-dimensional operations.

FIG. 1A shows a two-dimensional FDCT circuit 100 which includes a single one-dimensional FDCT circuit 102. Input data Din is transferred via a controller 101 to the FDCT circuit 102 which performs one-dimensional FDCT. The FDCT circuit 102 performs one-dimensional FDCT operations on the input data Din for N lines in the horizontal direction based on the butterfly operation. The results of the operations are transferred via the controller 101 to a register 103 for temporary storage.

Subsequently, the operational results temporarily stored in the register 103 are transferred via the controller 101 to the one-dimensional FDCT circuit 102. The FDCT circuit 102 performs one-dimensional FDCT operations on the operational results for N lines in the vertical direction. As a result, output data Dout is obtained which is the results of the two-dimensional FDCT of N×N elements. The output data Dout is output from the two-dimensional FDCT circuit 100 via the controller 101. The intermediate values attained in each FDCT operation in the horizontal direction and the vertical direction are also stored in the register 103.

When N=8, the one-dimensional FDCT circuit 102 can be constituted of 16 multipliers and 26 adders. When N=8, the two-dimensional FDCT circuit 100 should operate the FDCT circuit 102 a total of 16 times, eight times in each of the horizontal and vertical directions. Because the FDCT circuit 102 performs its operations based on the butterfly operation, it requires six clocks for one operation (i.e., for the one-dimensional FDCT operation of eight elements). Therefore, the time needed for the two-dimensional FDCT operation of 8×8 elements is 96 (=6×16) clocks.

As shown in FIG. 1B, a two-dimensional IDCT circuit 105 is constructed by replacing the FDCT circuit 102 in FIG. 1A with a one-dimensional IDCT circuit 104. When the IDCT circuit 104 employs the butterfly operation and when N=8, the IDCT circuit 104, like the FDCT circuit 102, can be constructed by 16 multipliers and 26 adders and needs six clocks for a single operation (for the one-dimensional IDCT operation of eight elements). The time needed for the two-dimensional IDCT operation of 8×8 elements is 96 clocks as in the case of the FDCT operation.

FIG. 2A shows a two-dimensional FDCT circuit 110 which includes two sets of one-dimensional FDCT circuit blocks. Input data Din is transferred via a controller 111 to an FDCT circuit 112 of N elements. The FDCT circuit 112 performs one-dimensional FDCT operations on the input data Din for N lines in the horizontal direction by using the butterfly operation. The results of the operations are transferred via the controller 111 to a register 114 to be registered there. The intermediate values attained in this FDCT operation are temporarily registered in a register 113.

Subsequently, the operational results temporarily stored in the register 114 are transferred via a controller 121 to a one-dimensional FDCT circuit 122 of N element(s). Using the butterfly operation, the FDCT circuit 122 performs one-dimensional FDCT operations on the operational results for N lines in the vertical direction. As a result, output data Dout is obtained which is the results of the two-dimensional FDCT of N×N elements. This output data Dout is output via the controller 121. The intermediate values attained in this FDCT operation are temporarily registered in a register 123.

As apparent from the above, the two-dimensional FDCT circuit 110 shown in FIG. 2A is equivalent to the circuit structure which has two two-dimensional FDCT circuits 100 in FIG. 1A connected in series. When N=8, each of the one-dimensional FDCT circuits 112 and 122 can be constituted of 16 multipliers and 26 adders. When N=8, the two-dimensional FDCT circuit 110 should operate each FDCT circuit eight times in the associated horizontal direction or vertical direction or should independently operate each of the FDCT circuits 112 and 122 a total of 16 times, eight times in the horizontal and vertical directions, respectively. Because each of the FDCT circuits 112 and 122 employs the butterfly operation, it requires six clocks for one operation (i.e., for the one-dimensional FDCT operation of eight elements). Therefore, the time needed for each FDCT circuit for the two-dimensional FDCT operation of 8×8 elements is 48 (=6×8) clocks.

As shown in FIG. 2B, a two-dimensional IDCT circuit 133 is constructed by replacing the one-dimensional FDCT circuits 112 and 122 of the two-dimensional FDCT circuit 110 with one-dimensional IDCT circuits 131 and 132. Those IDCT circuits 131 and 132 also employ the butterfly operation. When N=8, each of the IDCT circuits 131 and 132, like the FDCT circuit 112 or 122, can be constructed by 16 multipliers and 26 adders and needs six clocks for a single operation (for the one-dimensional IDCT operation of eight elements). The time needed for the two-dimensional IDCT operation of 8×8 elements is 48 clocks as in the case of the FDCT operation.

In the two-dimensional FDCT circuit 110 (or IDCT circuit 133), the FDCT circuits 112 and 122 (or the IDCT circuits 131 and 132) can be operated independently. This is advantageous in pipelining the operation circuits.

Recently, there has been a demand for more compact hardware for MPEG video encoders and MPEG video decoders while further improving the operation speeds. Thus, there is a need for more compact hardware of the two-dimensional FDCT circuit and IDCT circuit while further increasing the operation speeds thereof.

SUMMARY OF THE INVENTION

Broadly speaking, the present invention relates to a forward discrete cosine transform (FDCT) circuit and an inverse discrete cosine transform (IDCT) circuit which are smaller and operator faster than conventional circuits, even those which use a fast algorithm like the butterfly operation. The invention also relates to an MPEG video encoder and an MPEG video decoder which incorporate such FDCT and/or IDCT circuits.

An inverse discrete cosine transform (IDCT) circuit according to an embodiment of the invention includes a group of multipliers, and a group of adders/subtractors. The group of multipliers receive plural pieces of input data externally supplied in parallel. Each multiplier has a cosine constant to multiply to the received input data. The group of adders/subtractors receive multiplication results from the multipliers, and perform addition/subtraction thereon to produce output data, which is the result of inverse discrete cosine transform of the input data.

A forward discrete cosine transform (FDCT) circuit according to an embodiment of the present invention includes a group of input-stage adders/subtractors, a group of multipliers and a group of output-stage adders. The group of input-stage adders/subtractors receives plural pieces of input data externally supplied in parallel, and performs addition/subtraction on the input data. The group of multipliers receive computation results from the input-stage adders/subtractors. Each multiplier has a cosine constant to multiply to a particular one of the received computation results. The group of output-stage adders receive multiplication results from the multipliers, and add the multiplication results to produce output data, which is the result of forward discrete cosine transform of the input data.

Other aspects and advantages of the invention will become apparent from the following detailed description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12 is a block circuit diagram of an MPEG video encoder according to an eighth embodiment of the invention.

DETAILED DESCRIPTION OF THE PREFERRED EMBODIMENTS

First Embodiment

Figure 3:
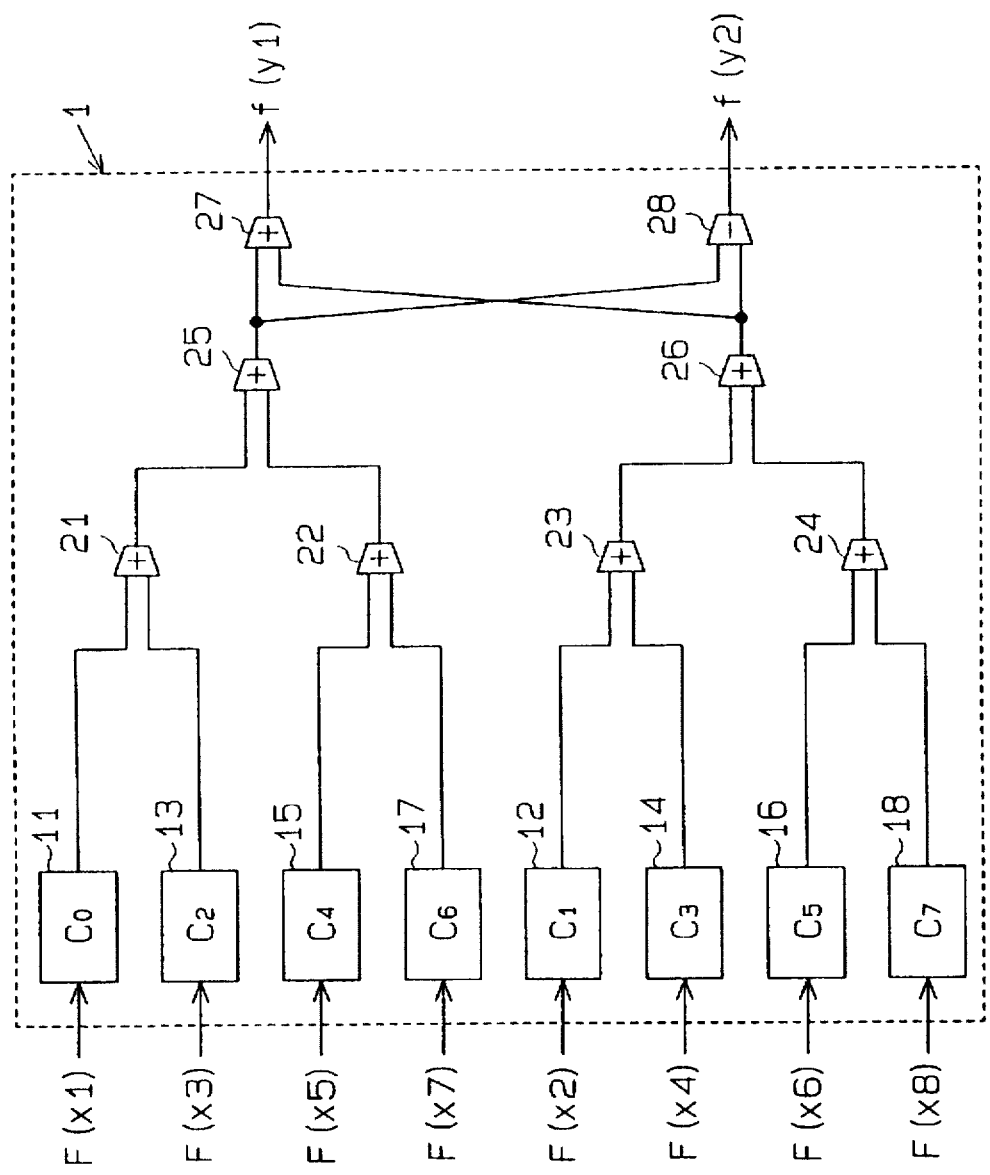
FIG. 3 is a block circuit diagram of an IDCT circuit according to a first embodiment of the invention.

A one-dimensional IDCT circuit according to a first embodiment of the present invention will now be described with reference to FIGS. 3 and 4. As shown in FIG. 3, a one-dimensional IDCT circuit 1 for eight elements includes eight constant multipliers 11 to 18 and eight adders 21 to 28.

The adder 28 serves as a subtractor. Each of the four adders 21–24 at the first stage is coupled to two of the two multipliers associated therewith. Each of the adders 25 and 26 at the second stage receives the outputs of the associated two first-stage adders, and outputs the result of the addition to the adder 27 and the adder 28 at the final stage. The individual multipliers 11–18 respectively receive input data $F(x1)$ to $F(x8)$, and the final-stage adders 27 and 28 respectively produce output data $f(y1)$ and $f(y2)$ which are the results of the IDCT operation on the input data $F(x1)$ to $F(x8)$.

Figure 4:
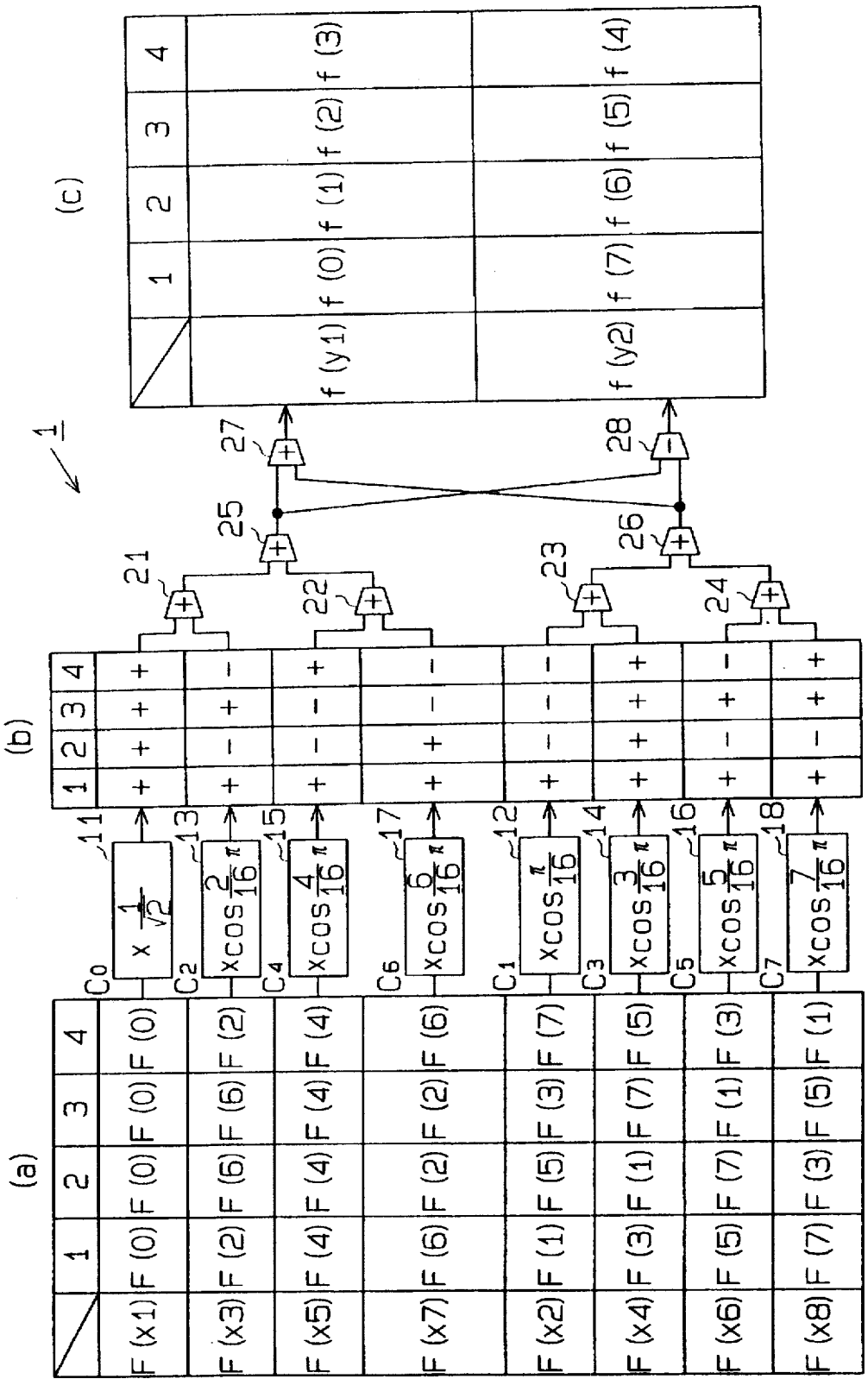
FIG. 4 is a diagram for explaining the operation of the IDCT circuit of the first embodiment.

FIG. 4 shows the relationship between the input data $F(x1)$ to $F(x8)$ in the IDCT circuit 1 and the output data $f(y1)$ and $f(y2)$. The individual constant multipliers 11–18 respectively multiply the respective input data $F(x1)$ to $F(x8)$ by their constants $C_0$ to $C_7$. The values of the constants $C_0$ to $C_7$ are defined according to the following equation (1).

$$Ci = \cos(i \times \pi/16)[i=0\text{--}7] \tag{1}$$

It is apparent from FIG. 4 that the two multipliers 11 and 14 produce outputs of positive values irrespective of the input values. The other constant multipliers 12, 13, and 15–18 are adapted to produce outputs of positive or negative values in accordance with the input values. In other words, the signs of the outputs of the constant multipliers 12, 13 and 15–18 are set as shown in a table (b) in FIG. 4 in accordance with the combinations of the input data $F(x1)$ to $F(x8)$ shown in a table (a) in FIG. 4. With respect to the combinations of the input data $F(x1)$ to $F(x8)$ shown in the table (a) in FIG. 4, the combinations of the output data $f(y1)$ and $f(y2)$ as shown in a table (c) in FIG. 4 are obtained. For the combination No. 1 in the tables (a)–(c) in FIG. 4, i.e., for $F(x1)=F(0)$, $F(x2)=F(1)$, $F(x3)=F(2)$, $F(x4)=F(3)$, $F(x5)=F(4)$, $F(x6)=F(5)$, $F(x7)=F(6)$, and $F(x8)=F(7)$, for example, the outputs of the individual multipliers 11–18 all become positive values and $f(y1)=f(0)$ and $f(y2)=f(7)$.

The IDCT circuit 1 performs operations expressed by the following equations (2A) to (5B).

$$f(0)=F(0)C_0+F(2)C_2+F(4)C_4+F(6)C_6+F(1)C_1+F(3)C_3+F(5)C_5+F(7)C_7 \tag{2A}$$

$$f(7)=F(0)C_0+F(2)C_2+F(4)C_4+F(6)C_6-F(1)C_1-F(3)C_3-F(5)C_5-F(7)C_7 \tag{2B}$$

$$f(1)=F(0)C_0+F(2)C_6-F(4)C_4-F(6)C_2+F(1)C_3-F(3)C_7-F(5)C_1-F(7)C_5 \tag{3A}$$

$$f(6)=F(0)C_0+F(2)C_6-F(4)C_4-F(6)C_2-F(1)C_3+F(3)C_7+F(5)C_1+F(7)C_5 \tag{3B}$$

$$f(2)=F(0)C_0-F(2)C_6-F(4)C_4+F(6)C_2+F(1)C_5-F(3)C_1+F(5)C_7+F(7)C_3 \tag{4A}$$

$$f(5)=F(0)C_0-F(2)C_6-F(4)C_4+F(6)C_2-F(1)C_5+F(3)C_1-F(5)C_7-F(7)C_3 \tag{4B}$$

$$f(3)=F(0)C_0-F(2)C_2+F(4)C_4-F(6)C_6+F(1)C_7-F(3)C_5+F(5)C_3-F(7)C_1 \tag{5A}$$

$$f(4)=F(0)C_0-F(2)C_2+F(4)C_4-F(6)C_6-F(1)C_7+F(3)C_5-F(5)C_3+F(7)C_1 \tag{5B}$$

This embodiment has the following function and advantages.

Every time the input data $F(x1)$ to $F(x8)$ for eight elements are input to the IDCT circuit 1, two output data $f(y1)$ and $f(y2)$ are attained in accordance with FIG. 4 and the equations (2A) to (5B). In other words, two pixels of output data are obtained with respect to one cycle of one-dimensional IDCT operations for eight elements.

Accordingly, eight pixels of output data are produced by four cycles of IDCT operations.

The IDCT circuit 1 according to this embodiment comprises eight multipliers 11–18 and eight adders 21–28, wherein the adder 28 functions as a subtractor. Since the eight multipliers 11–18 can be constructed by 44 adders, the IDCT circuit 1 can be constructed by 52 adders alone.

Figure 1A:
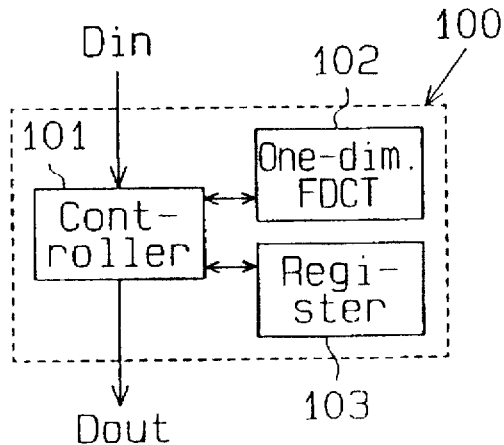
FIGS. 1A and 1B are block circuit diagrams of conventional art.
Figure 1B:
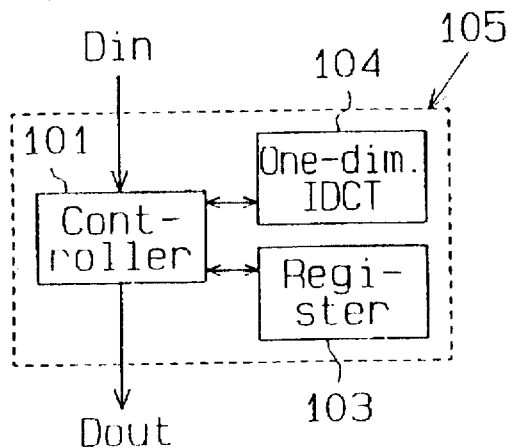

As multiplications are repeated in the butterfly operation, it is necessary to increase the number of intermediate operation bits (i.e., bit width) between the multipliers and adders in order to secure the necessary operation precision for the conventional IDCT circuit 104 (see FIG. 1B) which employs the butterfly operation. As each of the constant multipliers 11–18 in the IDCT circuit 1 of the first embodiment performs a single constant multiplication, as opposed to the conventional case, the first embodiment requires fewer intermediate operation bits. More specifically, the IDCT circuit 1 of this embodiment needs 16 intermediate operation bits whereas the conventional IDCT circuit 104 needs 18 intermediate operation bits. Therefore, the circuit scale (hardware scale) of the individual adders constituting the IDCT circuit 1 can be made smaller than that of the conventional IDCT circuit 104 which performs the butterfly operation.

In view of the above, the circuit scale of the IDCT circuit 1 of this embodiment can be reduced significantly as compared with the conventional IDCT circuit 104. Namely, when an LSI chip is produced, the circuit scale (chip occupying area) required by the IDCT circuit 1 is a significantly smaller than required by the conventional IDCT circuit 104, largely because the IDCT circuit can be implemented by adders alone which themselves quire less occupying area than multipliers.

The time needed for one cycle operation of the IDCT circuit 1 (the time needed for the one-dimensional IDCT operations for eight elements) is a total of four clocks, one clock for the operations of the constant multipliers 11–18, one clock for the operations of the first-stage adders 21–24, one clock for the operations of the second-stage adders 25 and 26 and one clock for the operations of the final-stage adders 27 and 28. The operation speed of the IDCT circuit 1 of this embodiment is thus faster than that of the conventional IDCT circuit 104.

Second Embodiment

A one-dimensional FDCT circuit according to a second embodiment of the invention will now be described with reference to FIG. 5. To avoid the redundant description, like or same reference numerals are given to those components which are the same as the corresponding components of the first embodiment.

Figure 5:
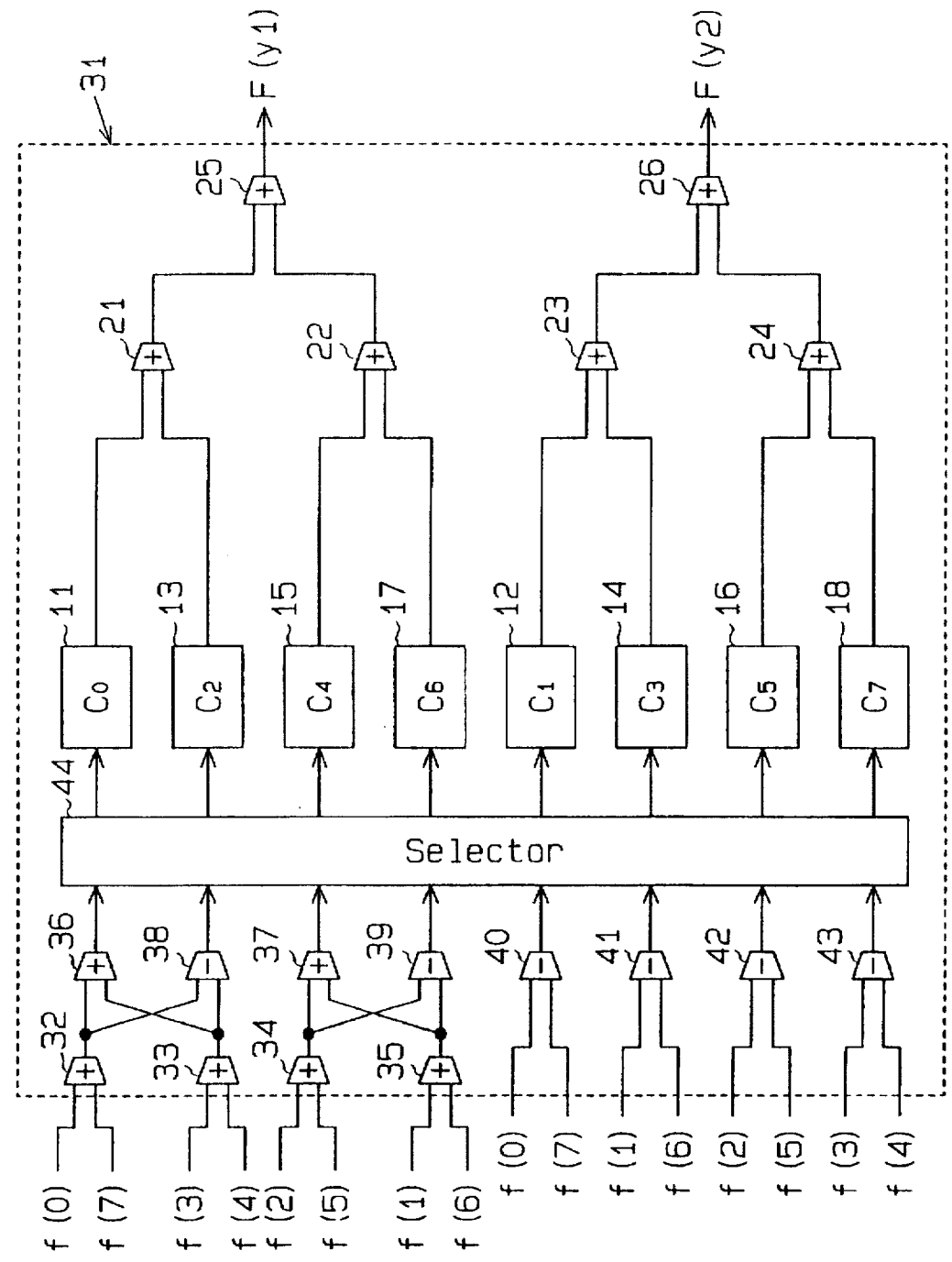
FIG. 5 is a block circuit diagram of an FDCT circuit according to a second embodiment of the invention.

As shown in FIG. 5, a one-dimensional FDCT circuit 31 for eight elements includes eight constant multipliers 11 to 18, a total of eighteen adders 21 to 26 and 32 to 43 and one selector 44. The adders 38 to 43 serve as subtractors. Each of the four first-stage adders 32–35 receives two input data. The second-stage adders include the four adders 36–39 each of which receives the outputs of the associated two first-stage adders, and the four adders 40–43 each of which receives two input data. The second-stage adders 36–43 are connected to the selector 44, which is also connected to the eight multipliers 11–18. Each of the four third-stage adders 21–24 is associated with and coupled to two of the multipliers 11–18. Each of the final-stage adders 25 and 26 receives the outputs from two of the associated third-stage adders 21–24. The FDCT circuit 31 therefore receives input data f(0) to f(7) and outputs output data F(y1) and F(y2), which are the results of the FDCT operations on the input data, from the final-stage adders 25 and 26.

Figure 6:
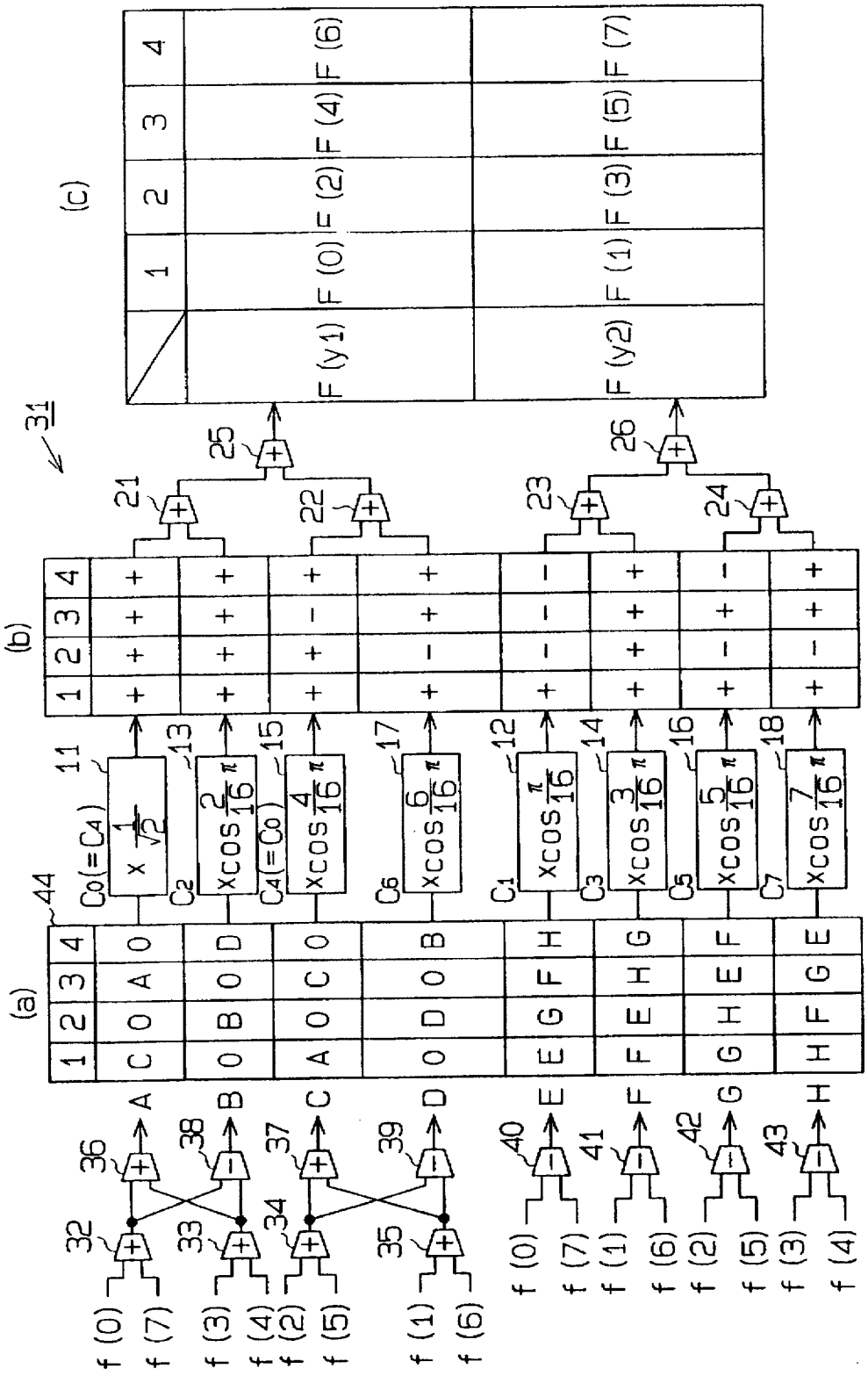
FIG. 6 is a diagram for explaining the operation of the FDCT circuit of the second embodiment.

FIG. 6 shows the relationship between the input data f(0) to f(7) and the output data F(y1) and F(y2) in the FDCT circuit 31. As apparent from FIG. 6, the three multipliers 11, 13 and 14 produce outputs of positive values irrespective of the input values. The other five constant multipliers 12 and 15–18 are adapted to produce outputs of positive or negative values in accordance with the input values.

The selector 44 switches the outputs of the adders 36 to 43 on the input side in accordance with switching rules as given in a table (a) in FIG. 6, and provides each of the multipliers 11–18 with the associated selected output.

The individual multipliers 11–18 multiply the associated selected outputs from the selector 44 by their respective constants $C_0$ to $C_7$. The values of the individual constants $C_0$–$C_7$ are given by the aforementioned equation (1). The signs of the outputs of the constant multipliers 12 and 15–18 are set as shown in a table (b) in FIG. 6 in accordance with the selected combinations (No. 1 to No. 4) of the switching rules shown in the table (a) in FIG. 6. In accordance with the selected combination of the switching rules, therefore, output data F(y1) and F(y2) as shown in a table (c) in FIG. 6 are obtained.

For the combination No. 1 in the tables (a)–(c) in FIG. 6, for example, the outputs of the individual multipliers 11–18 all become positive values and F(y1)=F(0) and F(y2)=F(1) with respect to the input data f(0) to f(7).

The FDCT circuit 31 performs operations expressed by the following equations (6A) to (9B).

$$F(0)=f(0)C_4+f(1)C_0+f(2)C_0+f(3)C_4+f(4)C_4+f(5)C_0+ \\ f(6)C_0+f(7)C_4 \quad (6A)$$

$$F(1)=f(0)C_1+f(1)C_3+f(2)C_5+f(3)C_7-f(4)C_7-f(5)C_5- \\ f(6)C_3-f(7)C_1 \quad (6B)$$

$$F(2)=f(0)C_2+f(1)C_6-f(2)C_6-f(3)C_2-f(4)C_2-f(5)C_6+ \\ f(6)C_6+f(7)C_2 \quad (7A)$$

$$F(3)=f(0)C_3-f(1)C_7-f(2)C_1-f(3)C_5+f(4)C_5+f(5)C_1+ \\ f(6)C_7-f(7)C_3 \quad (7B)$$

$$F(4)=f(0)C_0-f(1)C_4-f(2)C_4+f(3)C_0+f(4)C_0-f(5)C_4- \\ f(6)C_4+f(7)C_0 \quad (8A)$$

$$F(5)=f(0)C_5-f(1)C_1+f(2)C_7+f(3)C_3-f(4)C_3-f(5)C_7+ \\ f(6)C_1-f(7)C_5 \quad (8B)$$

$$F(6)=f(0)C_6-f(1)C_2+f(2)C_2-f(3)C_6-f(4)C_6+f(5)C_2- \\ f(6)C_2+f(7)C_6 \quad (9A)$$

$$F(7)=f(0)C_7-f(1)C_5+f(2)C_3-f(3)C_1+f(4)C_1-f(5)C_3+ \\ f(6)C_5-f(7)C_7 \quad (9B)$$

wherein the constant $C_0$ is equal to the constant $C_4$ in the equations 6A and 8A.

The second embodiment has the following function and advantages.

When the input data f(0) to f(7) for eight elements are input to the FDCT circuit 31, two output data F(y1) and F(y2) are acquired in accordance with FIG. 6 and the equations (6A) to (9B). In other words, two pixels of output data are obtained with respect to one cycle of one-dimensional FDCT operations for eight elements.

The FDCT circuit 31 according to this embodiment comprises eight constant multipliers 11–18, eighteen adders 21–26 and 32–43, and one selector 44. Since the eight multipliers 11–18 can be constructed by 44 adders, the FDCT circuit 31 can be constructed by 62 adders and one selector 44. Because the selector 44 can be accomplished by a combination of simple transfer gates, the circuit scale of the selector 44 is considerably smaller than that of each of the adders 21–26 and 32–43. Accordingly, the circuit scale of the FDCT circuit 31 becomes substantially equivalent to the IDCT circuit 1 of the first embodiment with ten additional adders.

As multiplications are repeated in the butterfly operation, it is necessary to increase the number of intermediate operation bits (bit width) between the multipliers and adders in order to secure the necessary operation precision for the conventional FDCT circuit 102 (see FIG. 1A) which employs the butterfly operation. Because each of the constant multipliers 11–18 in the FDCT circuit 31 of the second embodiment performs a single constant multiplication, as opposed to the conventional case, the embodiment requires fewer intermediate operation bits. Therefore, the circuit scale of each of the adders constituting the FDCT circuit 31 can be made smaller than that of the conventional FDCT circuit 102 which performs the butterfly operation.

In view of the above, the circuit scale of the FDCT circuit 31 of this embodiment can be reduced significantly as compared with the conventional FDCT circuit 102. Namely, when an LSI chip is produced, the circuit scale (chip occupying area) required by the FDCT circuit 31 is significantly smaller than required by the conventional FDCT circuit 102, largely because the FDCT circuit 31 can be implemented by adders alone which themselves require less occupying area than multipliers.

The time needed for one cycle operation of the FDCT circuit 31 (the time needed for the one-dimensional FDCT operations for eight elements) is a total of five clocks, one clock for the operations of the first-stage adders 32–35, one clock for the operations of the second-stage adders 36–43, one clock for the operations of the constant multipliers 11–18, one clock for the operations of the third-stage adders 21–24 and one clock for the operations of the final-stage adders 25 and 26. The operation speed of the FDCT circuit 31 of this embodiment is thus faster than that of the conventional FDCT circuit 102.

Third Embodiment

A circuit for both one-dimensional FDCT and IDCT according to a third embodiment of this invention will be now described with reference to FIG. 7. To avoid the redundant description, like or same reference numerals are given to those components which are the same as the corresponding components of the first and second embodiments.

Figure 7:
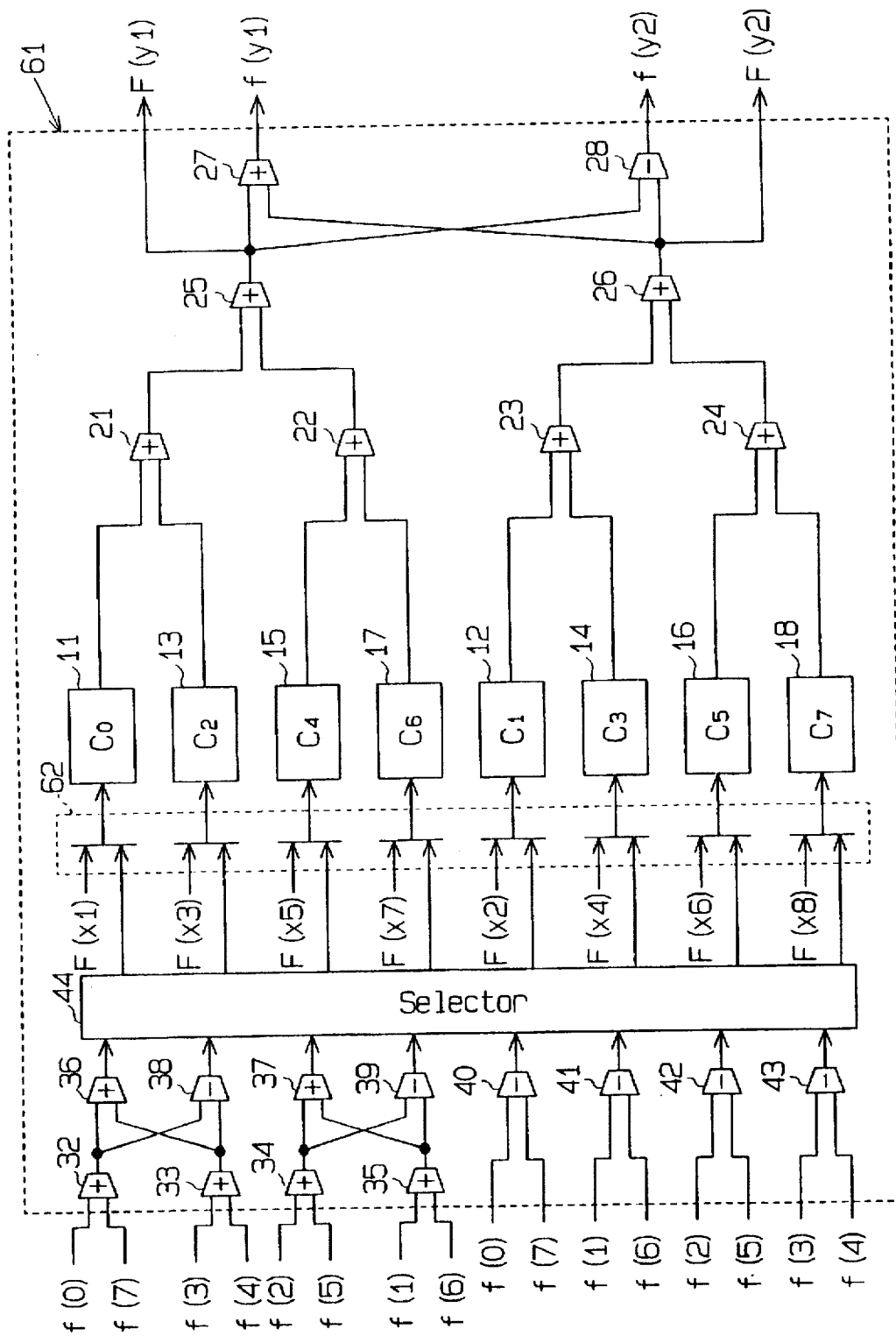
FIG. 7 is a block circuit diagram of an FDCT/IDCT circuit according to a third embodiment of the invention.

As shown in FIG. 7, a one-dimensional FDCT/IDCT circuit 61 for eight elements includes eight constant multipliers 11 to 18, twenty adders 21 to 28 and 32 to 43, a selector 44 and an input selector 62. The adder 28 serves as a subtractor and the six second-stage adders 38–43 serve as subtractors. The two multipliers 11 and 14 produce positive outputs regardless of the input values, and the other multipliers 12, 13 and 15–18 produce positive or negative outputs in accordance with the input values. The FDCT/IDCT circuit 61 can produce output data f(y1) and f(y2), which are the results of the IDCT operations on the input data F(x1)–F(x8), and output data F(y1) and F(y2), which are the results of the FDCT operations on the input data f(0)–f(7).

In a sense, the FDCT/IDCT circuit 61 is equivalent to the IDCT circuit 1 in FIG. 3 and the FDCT circuit 31 in FIG. 5. The input selector 62 provides the constant multipliers 11–18 with externally supplied input data F(x1)–F(x8) in an IDCT operation mode, and provides those multipliers 11–18 with the associated outputs from the first selector 44 in an FDCT operation mode. The signs of the outputs of the individual multipliers 11–18 are set in accordance with the table (b) in FIG. 4 in IDCT operation mode and are set in accordance with the table (b) in FIG. 6 in FDCT operation mode.

The output data f(y1) and f(y2) in the IDCT operation mode are output from the adders 27 and 28 and the output data F(y1) and F(y2) in the FDCT operation mode are output from the adders 25 and 26. In the FDCT/IDCT circuit 61, the IDCT operation and the FDCT operation are switched one from to the other by selectively switching the input data by means of the input selector 62 and by switching the positive and negative signs of the outputs of the individual multipliers 11–18 as appropriate.

The relationship between the input data F(x1) to F(x8) and the output data f(y1) and f(y2) in the FDCT/IDCT circuit 61, like the IDCT circuit 1 of the first embodiment, depends on the relationship shown in FIG. 4 and by the equations (2A) to (5B). The relationship between the input data f(0) to f(7) and the output data F(y1) and F(y2) in the FDCT/IDCT circuit 61, like the FDCT circuit 31 of the second embodiment, depends on the relationship shown in FIG. 6 and by the equations (6A) to (9B). The FDCT/IDCT circuit 61 has both the functions of the IDCT circuit 1 and the FDCT circuit 31.

The FDCT/IDCT circuit 61 comprises eight constant multipliers 11–18, twenty adders 21–28 and 32–43 and two selectors 44 and 62. Since the eight multipliers 11–18 can be accomplished by 44 adders, the FDCT/IDCT circuit 61 can be constructed by 64 adders and two selectors 44 and 62. As each of the selectors 44 and 62 can be accomplished by a combination of simple transfer gates, the circuit scale of which is considerably smaller than that of each of the adders 21–26 and 32–43. Accordingly, the circuit scale of the FDCT/IDCT circuit 61 is substantially equivalent to the FDCT circuit 31 of the second embodiment with two additional adders.

Basically, the FDCT/IDCT circuit 61 has the same function and advantages as the IDCT circuit 1 of the first embodiment at the time of executing IDCT operations, and has the same function and advantages as the FDCT circuit 31 of the second embodiment at the time of executing FDCT operations.

Fourth Embodiment

A two-dimensional FDCT circuit and/or IDCT circuit according to the fourth embodiment of the invention is now described with reference to FIGS. 8A, 8B and 8C.

Figure 8A:
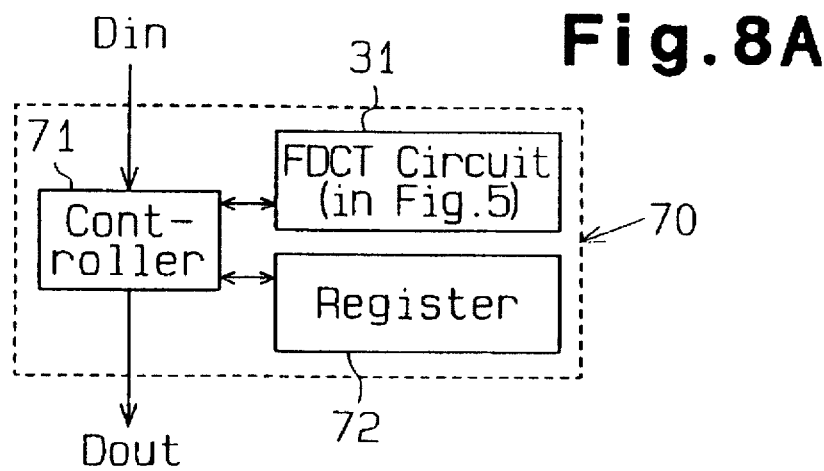
FIGS. 8A, 8B and 8C are block circuit diagrams of two-dimensional FDCT circuits and/or IDCT circuits according to a fourth embodiment of the invention.

FIG. 8A shows a two-dimensional FDCT circuit 70 of 8×8 elements according to this invention. This circuit 70 includes a controller 71, a register 72 and the FDCT circuit 31 of the second embodiment. Input data Din is transferred via the controller 71 to the FDCT circuit 31, which in turn performs one-dimensional FDCT on the received input data Din for eight lines in the horizontal direction. The operational results are transferred via the controller 71 to the register 72 to be registered. Then, the operational results held in the register 72 are transferred via the controller 71 to the FDCT circuit 31. The FDCT circuit 31 performs one-dimensional FDCT operations on the operational results for eight lines in the vertical direction. Accordingly, output data Dout is obtained as the results of the two-dimensional FDCT of 8×8 elements. The output data Dout is output from the two-dimensional FDCT circuit 70 via the controller 71.

The two-dimensional FDCT circuit 70 operates the FDCT circuit 31 16 times in total, eight times in the horizontal direction and eight times in the vertical direction. As mentioned earlier, the time needed for the FDCT circuit 31 to complete a single operation (the time for the one-dimensional FDCT operation of eight elements) is five clocks. Thus, the time needed for a two-dimensional FDCT operation for 8×8 elements becomes 80 (=16×5) clocks. Therefore, the two-dimensional FDCT circuit 70 of this embodiment can operate faster than the conventional two-dimensional FDCT circuit 100 (see FIG. 1A).

Figure 8B:
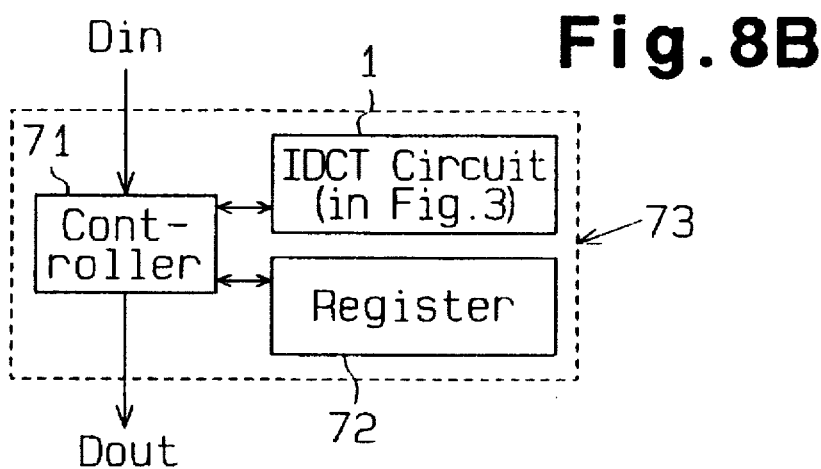

A two-dimensional IDCT circuit 73 of 8×8 elements can be constructed by replacing the FDCT circuit 31 in FIG. 8A with the IDCT circuit 1 of the first embodiment as shown in FIG. 8B. The time needed for the IDCT circuit 1 to complete a single operation (the time for the one-dimensional IDCT operation of eight elements) is four clocks, as mentioned earlier. Thus, the time needed for a two-dimensional IDCT operation for 8×8 elements becomes 64 (=16×4) clocks. Therefore, the two-dimensional IDCT circuit 73 of this embodiment can operate faster than the conventional two-dimensional IDCT circuit 105 (see FIG. 1B).

Figure 8C:
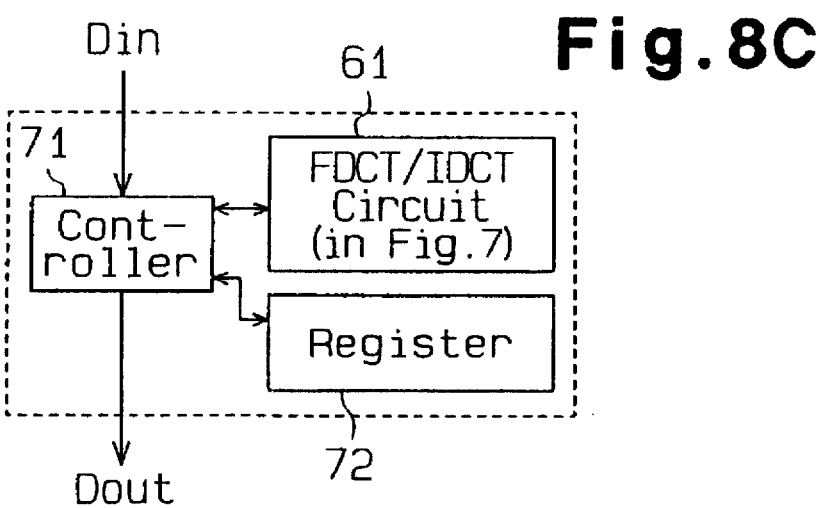

The FDCT circuit 31 in FIG. 8A may be replaced with the FDCT/IDCT circuit 61 of the third embodiment to realize a circuit as shown in FIG. 8C.

Fifth Embodiment

A two-dimensional FDCT circuit and/or IDCT circuit according to a fifth embodiment of this invention will be now described with reference to FIGS. 9A, 9B and 9C.

Figure 9A:
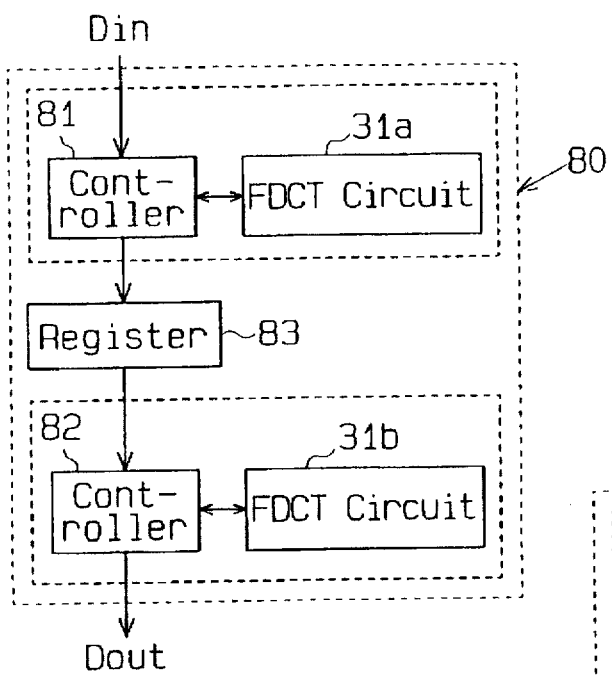
FIGS. 9A, 9B and 9C are block circuit diagrams of two-dimensional FDCT circuits and/or IDCT circuits according to a fifth embodiment of the invention.

FIG. 9A shows a two-dimensional FDCT circuit 80 of 8×8 elements according to the fifth embodiment of the invention. The FDCT circuit 80 includes two controllers 81 and 82, one register 83 and two FDCT circuits 31a and 31b (each identical to the FDCT circuit 31 of the second embodiment). Input data Din is transferred via the first controller 81 to the first FDCT circuit 31a, which in turn performs one-dimensional FDCT on the received input data Din for eight lines in the horizontal direction. The operational results are transferred via the first controller 81 to the register 83 to be stored therein. Next, the operational results held in the register 83 are transferred via the second controller 82 to the second FDCT circuit 31b. The second FDCT circuit 31b performs one-dimensional FDCT operations on the operational results for eight lines in the vertical direction. Accordingly, output data Dout is obtained as the results of the two-dimensional FDCT of 8×8 elements. The output data Dout is output from the two-dimensional FDCT circuit 80 via the second controller 82.

Figure 2A:
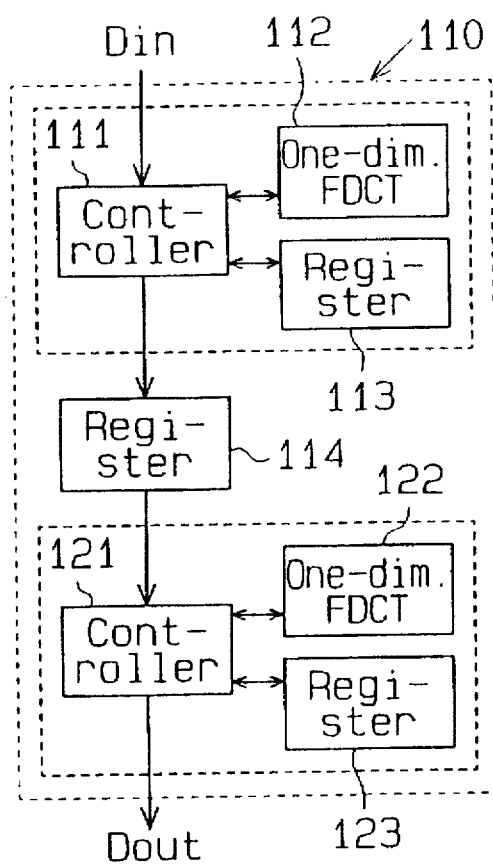
FIGS. 2A and 2B are block circuit diagrams of conventional art.

The two-dimensional FDCT circuit 80 independently operates the FDCT circuits 31a and 31b eight times each, or operates the FDCT circuit 31a eight times in the horizontal direction and the FDCT circuit 31b eight times in the vertical direction. The time needed for the FDCT circuits 31a and 31b to complete a single operation is five clocks. Thus, the time needed for a two-dimensional FDCT operation for 8×8 elements becomes 40 (=8×5) clocks. Therefore, the two-dimensional FDCT circuit 80 of this embodiment can operate faster than the conventional two-dimensional FDCT circuit 110 (see FIG. 2A).

The conventional two-dimensional FDCT circuit 110 needs the registers 113 and 123 for temporarily storing the intermediate values obtained in the butterfly operation. The two-dimensional FDCT circuit 80 of the fifth embodiment however does not need such registers; hence, its circuit scale is smaller than that of the conventional two-dimensional FDCT circuit 110.

Figure 2B:
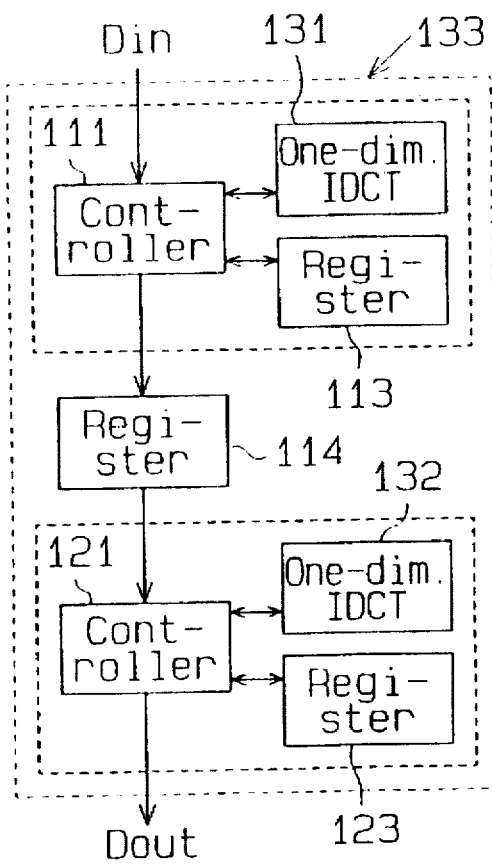
Figure 9B:
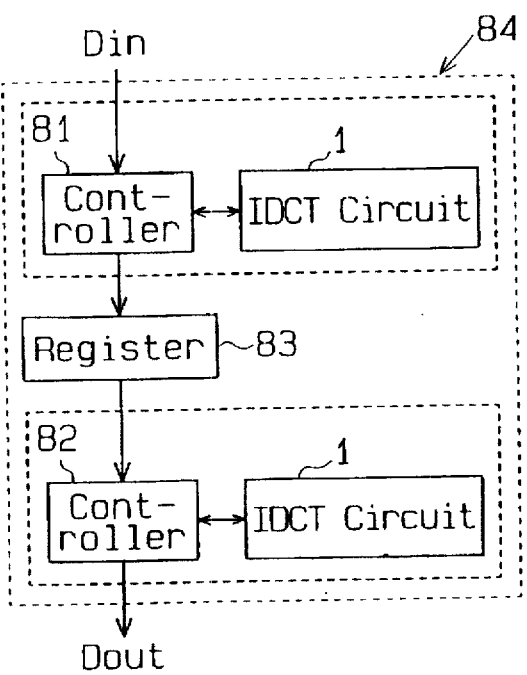

Each of the FDCT circuits 31a and 31b in FIG. 9A may be replaced with the IDCT circuit 1 of the first embodiment to realize a two-dimensional IDCT circuit 84 of 8×8 elements as shown in FIG. 9B. The time needed for the IDCT circuit 1 to complete a single operation is four clocks. Thus, the time needed for a two-dimensional IDCT operation for 8×8 elements is 32 (=8×4) clocks. Therefore, the two-dimensional IDCT circuit 84 of this embodiment can operate faster than the conventional two-dimensional IDCT circuit 133 (see FIG. 2B). Because it is unnecessary to provide the registers 113 and 123 for temporarily storing the intermediate values obtained in the butterfly operation, the circuit scale of the two-dimensional IDCT circuit 84 of this invention is smaller than that of the conventional two-dimensional IDCT circuit 133.

Figure 9C:
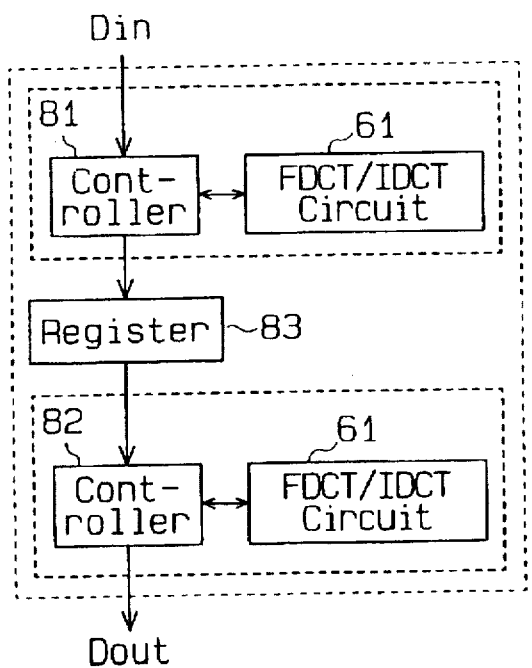

Each of the FDCT circuits 31a and 31b in FIG. 9A may be replaced with the FDCT/IDCT circuit 61 of the third embodiment to realize a two-dimensional FDCT/IDCT circuit as shown in FIG. 9C.

Since the circuits as shown in FIGS. 9A, 9B and 9C can independently operate the FDCT circuits 31a and 31b (the IDCT circuit 1 or the FDCT/IDCT circuit 61), the circuits are further thus advantageous because operations are able to be pipelined by the circuits.

Sixth Embodiment

A two-dimensional FDCT circuit and/or IDCT circuit according to the sixth embodiment of the invention will now be described with reference to FIG. 10.

Figure 10:
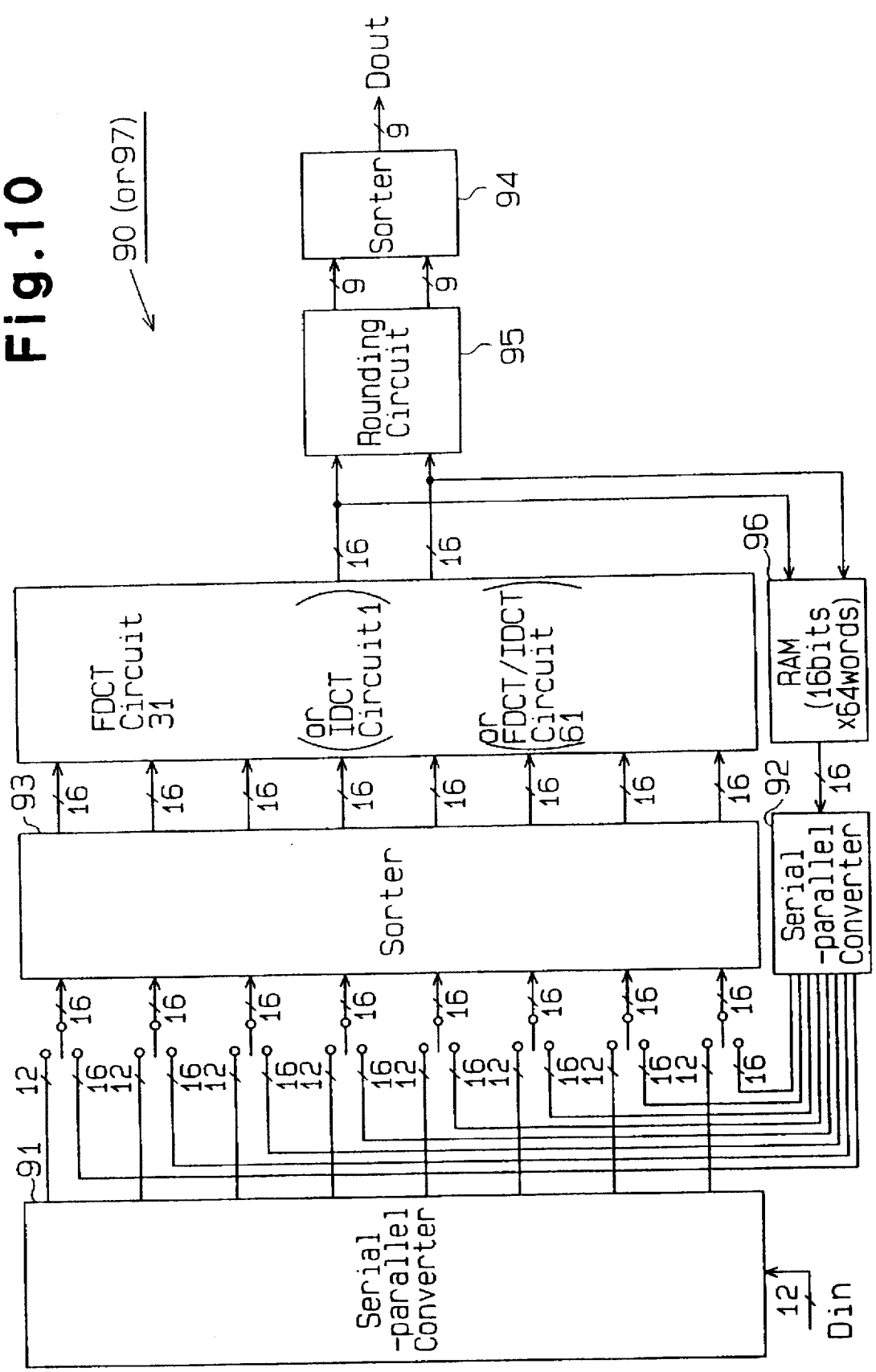
FIG. 10 is a block circuit diagram of a two-dimensional FDCT circuit and/or IDCT circuit according to a sixth embodiment of the invention.

FIG. 10 shows a two-dimensional FDCT circuit 90 of 8×8 elements, which includes first and second serial-parallel converters 91 and 92, first and second sorters 93 and 94, a rounding circuit 95, a RAM (Random Access Memory) 96 for temporary storage and the FDCT circuit 31 of the second embodiment.

Input data Din consisting of 12 bits is converted to data for eight pixels by the first serial-parallel converter 91 and this converted data is sent to the first sorter 93. There are four sorting patterns for the first sorter 93, and the FDCT circuit 31 provides output data for every two pixels for each sorting pattern. When the data processing for the four sorting patterns is completed, output data for eight pixels are obtained and are then stored in the RAM 96.

The instant the 8-pixel output data are obtained, the next eight pixels of data are input to the first serial-parallel converter 91. The next eight pixels of data are subjected to one-dimensional FDCT operation and 8-pixel output are stored in the RAM 96 as in the aforementioned manner. As the above processing is repeated eight times, 64 pixels of output data are stored in the RAM 96. Then, the inputs to the first sorter 93 are switched so that the first sorter 93 are connected via the second serial-parallel converter 92 to the RAM 96 to read the stored data therefrom. The processing similar to the one discussed above is performed on the read data by the second serial-parallel converter 92, the sorter 93 and the FDCT circuit 31. The rounding circuit 95 performs rounding on the operational results output from the FDCT circuit 31.

Thereafter, the same processing is repeated eight times, and the last data obtained is sorted by the second sorter 94, thus yielding output data Dout as the results of the two-dimensional FDCT of 8×8 elements.

This two-dimensional FDCT circuit 90 is equivalent to a circuit obtained by replacing the controller 71 in the two-dimensional FDCT circuit 70 in FIG. 8A with the circuits 91–95 and replacing the register 72 with the RAM 96 for temporary storage. Like the two-dimensional FDCT circuit 70, therefore, this two-dimensional FDCT circuit 90 can perform fast operations.

The FDCT circuit 31 in FIG. 10 may be replaced with the IDCT circuit 1 of the first embodiment to accomplish a two-dimensional IDCT circuit 97 of 8×8 elements. The FDCT circuit 31 in FIG. 10 may be also replaced with the FDCT/IDCT circuit 61 of the third embodiment.

Seventh Embodiment

Figure 11:
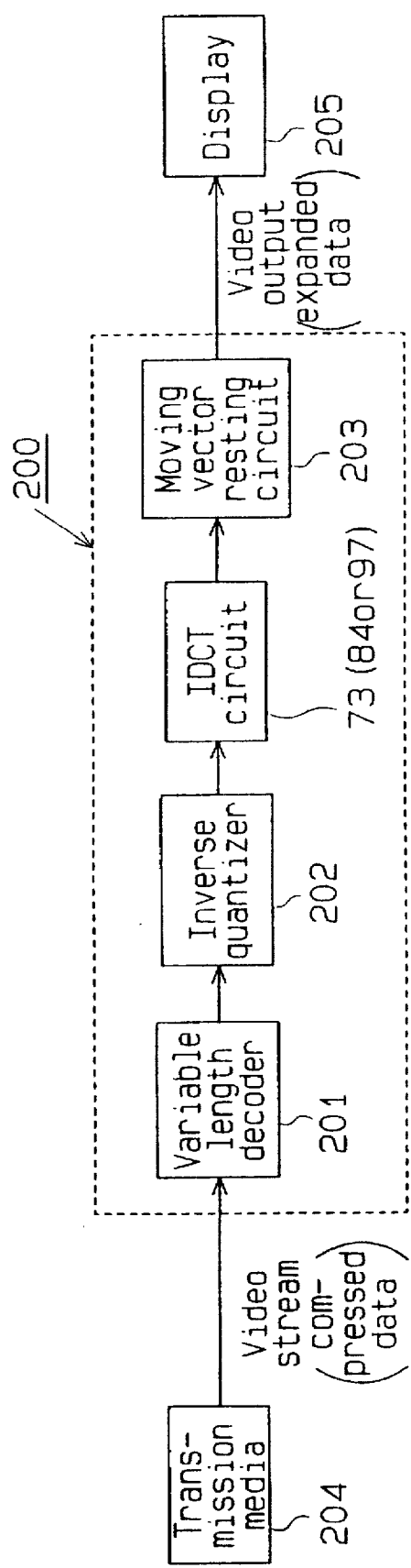
FIG. 11 is a block circuit diagram of an MPEG video decoder according to a seventh embodiment of the invention.

An MPEG video decoder according to the seventh embodiment of the invention will be now discussed with reference to FIG. 11. An MPEG video decoder 200 shown in FIG. 11 includes a variable length decoder 201, an inverse quantizer 202, a two-dimensional IDCT circuit 73 as shown in FIG. 8B, and a motion vector restoring circuit 203.

The variable length decoder 201 receives a video stream as a stream of compressed video data from transmission media 204 and performs variable length decoding based on the Huffman codes stored in a Huffman table (not shown) provided in the decoder 201. The transmission media 204 include a communications medium like LAN (Local Area Network), storage media like DVD (Digital Video Disk) and VTR (Video Tape Recorder), and broadcasting media like the ground broadcasting, satellite broadcasting and CATV (Community Antenna Television).

The inverse quantizer 202 performs inverse quantization on the results of the decoding by the variable length decoder 201, based on quantization threshold values stored in an incorporated quantization table (not shown), to obtain DCT coefficients. The IDCT circuit 73 performs IDCT on the DCT coefficients computed by the inverse quantizer 202.

The motion vector restoring circuit 203 restores the motion vectors with respect to the processing results from the IDCT circuit 73 to produce video outputs or data obtained by expanding the video stream. The video outputs are supplied to a display 205.

Because the two-dimensional IDCT circuit 73 used in this embodiment can operate fast and has a small hardware scale, the MPEG video decoder 200 can also operate fast and has a small hardware scale. The IDCT circuit 73 in this embodiment may be replaced with the aforementioned IDCT circuit 84 or 97.

Eighth Embodiment

An MPEG video encoder according to an eighth embodiment of the invention is now discussed with reference to FIG. 12. An MPEG video encoder 300 shown in FIG. 12 includes a motion compensation circuit 301, an FDCT circuit 70 as shown in FIG. 8A, a quantizer 302, and a variable length encoder 303.

A video camera 304 senses an image to produce an image input of expanded data. The motion compensation circuit 301 receives the image input from the video camera 304 and produces motion vectors based on the image input. The FDCT circuit 70 performs FDCT on the image input from the video camera 304.

The quantizer 302 performs quantization on the processing results from the FDCT circuit 70, based on quantization threshold values stored in an incorporated quantization table (not shown). The variable length encoder 303 performs variable length encoding on the processing results from the quantizer 302 to produce a video stream as compressed video data of the image input. The video stream is transmitted via transmission media 204 to the MPEG video decoder 200 as discussed in the section concerning the seventh embodiment.

Because the two-dimensional FDCT circuit 70 used in this embodiment can operate fast and has a small hardware scale, the MPEG video encoder 300 can also operate fast and has a small hardware scale. The FDCT circuit 70 in this embodiment may be replaced with the aforementioned FDCT circuit 80 or 90.

Although only eight embodiments of the present invention have been described herein, it should be apparent to those skilled in the art that the present invention may be embodied in many other specific forms without departing from the spirit or scope of the invention. Particularly, it should be understood that this invention may be embodied in the following forms.

Although the foregoing descriptions of the first and third embodiments have discussed one-dimensional IDCT circuits of eight elements, the invention may more generally be adapted to a one-dimensional IDCT circuit of N elements (N being a natural number). Although the foregoing descriptions of the second and third embodiments have discussed one-dimensional FDCT circuits of eight elements, the invention may more generally be adapted to a one-dimensional FDCT circuit of N elements (N being a natural number other than "8"). Further, while the foregoing descriptions of the fourth and fifth embodiments have discussed two-dimensional FDCT circuits and/or IDCT circuits of 8×8 elements, the invention may more generally be adapted to a two-dimensional FDCT circuit and/or IDCT circuit of N×N elements. As N gets bigger in those cases, the encoding efficiency gets better but the number of operations increases. That is, there is a tradeoff relation between the encoding efficiency and the number of operations.

The signal processing by the individual circuits (1–97) in the first to sixth embodiments may be implemented by software executing on a CPU.

The invention may be adapted for not only an MPEG video decoder but also all other types of data processing apparatus which use DCT. The invention may also be adapted for data processing systems which are originated from the MPEG system or data processing systems which include the MPEG system.

Therefore, the present examples and embodiments are to be considered as illustrative and not restrictive and the invention is not to be limited to the details given herein, but may be modified within the scope of the appended claims.

What is claimed is:

1. A one-dimensional inverse discrete cosine transform circuit comprising:

a group of multipliers for receiving plural pieces of input data externally supplied in parallel, each multiplier having a cosine constant to multiply with received input data; and a group of adders/subtractors for receiving multiplication results from said multipliers and performing addition/subtraction thereon to produce output data, said output data being the results of an inverse discrete cosine transform of said input data;

wherein each of said multipliers is adapted to set a multiplication result to a positive value or a negative value in accordance with how said plural pieces of input data are distributed to said multipliers.

2. A one-dimensional inverse discrete cosine transform circuit comprising:

a group of eight multipliers for receiving eight pieces of input data externally supplied in parallel, each multiplier having a cosine constant to multiply with a particular one said plural pieces of input data, each of said multipliers being adapted to set a multiplication result to a positive value or a negative value in accordance with how said plural pieces of input data are distributed to said multipliers; and a group of adders/subtractors for receiving multiplication results from said eight multipliers and performing addition/subtraction thereon to produce a pair of output data, said pair of output data being results of inverse discrete cosine transform of said input data.

3. A one-dimensional forward discrete cosine transform circuit comprising:

a group of input-stage adders/subtractors for receiving plural pieces of input data externally supplied in parallel and for performing addition/subtraction on said input data;

a group of multipliers for receiving computation results from said input-stage adders/subtractors, each multiplier having a cosine constant to multiply with a particular one of said computation results;

a group of output-stage adders for receiving multiplication results from said multipliers and for adding said multiplication results to produce output data, said output data being the results of a forward discrete cosine transform of said input data; and a selector, provided between said input-stage adders/subtractors and said group of multipliers, for supplying said computation results from said input-stage adders/subtractors to said group of multipliers respectively in accordance with predetermined switching rules.

4. The one-dimensional forward discrete cosine transform circuit according to claim 3, further comprising:

said group of input-stage adders/subtractors producing plural pieces of computation results;

said switching rules selector operating in response to said predetermined switching rules for supplying selected ones of said pieces of said computation results to selected ones of said multipliers of said group of multipliers.

5. A one-dimensional forward discrete cosine transform circuit comprising:

a group of input-stage adders/subtractors for receiving plural pieces of input data externally supplied in parallel and for performing addition/subtraction on said input data:

a group of multipliers for receiving computation results from said input-stage adders/subtractors, each multiplier having a cosine constant to multiply with a particular one of said computation results;

a group of output-stage adders for receiving multiplication results from said multipliers and for adding said multiplication results to produce output data, said output data being the results of a forward discrete cosine transform of said input data; and a selector, provided between said input-stage adders/subtractors and said group of multipliers, for supplying the computation results from said input-stage adders/subtractors to said group of multipliers, respectively, in accordance with predetermined switching rules;

wherein each of said multipliers is adapted to set a multiplication result to a positive value or a negative value in accordance with how said computation results from said input-stage adders/subtractors are distributed to said multipliers by said selector.

6. A one-dimensional forward discrete cosine transform circuit comprising:

a group of input-stage adders/subtractors for receiving eight pieces of input data externally supplied in parallel and for performing addition/subtraction on said input data;

a group of eight multipliers for multiplying values input thereto by cosine constants;

a selector, provided between said input-stage adders/subtractors and said group of eight multipliers, for supplying computation results from said input-stage adders/subtractors to said group of eight multipliers in accordance with predetermined switching rules, each of said eight multipliers being adapted to set a multiplication result to a positive value or a negative value in accordance with how said computation results from said input-stage adders/subtractors are distributed to said eight multipliers by said selector; and a group of output-stage adders, coupled to said eight multipliers, for adding said multiplication results from said eight multipliers to produce a pair of output data, said output data being results of forward discrete cosine transform of said input data.

7. A one-dimensional discrete cosine transform circuit comprising:

a group of input-stage adders/subtractors for receiving plural pieces of first input data externally supplied in parallel, and for performing addition/subtraction on said first input data, said first input data being subject to forward discrete cosine transform;

an input selector for receiving data of computation results from said input-stage adders/subtractors and plural pieces of second input data externally supplied in parallel and for selectively outputting either said data of said computation results from said input-stage adders/subtractors or said second input data, said second input data being subjected to inverse discrete cosine transform;

a group of multipliers, coupled to said input selector, for multiplying said selected data from said input selector by cosine constants;

a group of output-stage adders/subtractors for receiving multiplication results from said multipliers and for performing addition/subtraction on said multiplication results to produce output data, wherein said output data represents the results of a forward discrete cosine transform when said computation results from said input-stage adders/subtractors are selected by said input selector and represents the results of an inverse discrete cosine transform when said second input data are selected by said input selector; and a switching rules selector, provided between said input-stage adders/subtractors and said group of multipliers, for supplying said computation results from said input-stage adders/subtractors to said group of multipliers in accordance with predetermined switching rules.

8. The one-dimensional discrete cosine transform circuit according to claim 7, further comprising:

said input stage adders/subtractors producing plural pieces of said computation results; and said switching rules selector operating in accordance with said predetermined switching rules for supplying selected ones of said pieces of said computation results to predetermined ones of said multipliers of said group of multipliers.

9. A one-dimensional discrete cosine transform circuit comprising:

a group of input-stage adders/subtractors for receiving plural pieces of first input data externally supplied in parallel, and for performing addition/subtraction on said first input data, said first input data to being subject to forward discrete cosine transform;

an input selector for receiving data of computation results from said input-stage adders/subtractors and plural pieces of second input data externally supplied in parallel and for selectively outputting either said data of said computation results from said input-stage adders/subtractors or said second input data, said second input data being subjected to inverse discrete cosine transform;

a group of multipliers, coupled to said input selector, for multiplying said selected data from said input selector by cosine constants;

a group of output-stage adders/subtractors for receiving multiplication results from said multipliers and for performing addition/subtraction on said multiplication results to produce output data, wherein said output data represents the results of a forward discrete cosine transform when said computation results from said input-stage adders/subtractors are selected by said input selector and represents the results of an inverse discrete cosine transform when said second input data are selected by said input selector; and a switching rules selector, provided between said input-stage adders/subtractors and said group of multipliers, for supplying said computation results from said input-state adders/subtractors to said group of multipliers in accordance with predetermined switching rules;

wherein each of said multipliers is adapted to set a multiplication result to a positive value or a negative value in accordance with how said computation results from said input-stage adders/subtractors are distributed to said multipliers by said switching rules selector.

10. A one-dimensional discrete cosine transform circuit comprising:

a group of input-stage adders/subtractors for receiving plural pieces of first input data externally supplied in parallel and for performing addition/subtraction on said first input data, said first input data being subjected to forward discrete cosine transform;

an input selector for receiving data of computation results from said input-stage adders/subtractors and plural pieces of second input data externally supplied in parallel and for selectively outputting either said data of said computation results from said input-stage adders /subtracts or said second input data, said second input data being subjected to inverse discrete cosine transform;

a group of multipliers, coupled to said input selector, for multiplying said selected data from said input selector by cosine constants; and a group of output-stage adders/subtractors for receiving multiplication results from said multipliers and for performing addition/subtraction on said multiplication results to produce output data, wherein said output data represents the results of a forward discrete cosine transform when said computation results from said input-stage adders/subtractors are selected by said input selector and represents the results of an inverse discrete cosine transform when said second input data are selected by said input selector;

wherein each of said multipliers is adapted to set a multiplication result to a positive value or a negative value in accordance with how the plural pieces of said second input data are distributed to said multipliers.

11. A two-dimensional forward discrete cosine transform circuit comprising:

a one-dimensional forward discrete cosine transform circuit said one-dimensional circuit comprising:

a group of input-stage adders/subtractors for receiving plural pieces of input data externally supplied in parallel and for performing addition/subtraction on said input data;

a group of multipliers for receiving computation results from said input-stage adders/subtractors, each multiplier having a cosine constant to multiply with a particular one of the computation results;

a group of output-stage adders for receiving multiplication results from said multipliers and for adding said multiplication results to produce output data, said output data being the results of a forward discrete cosine transform of said input data; and a selector, provided between said input-stage adders/subtractors and said group of multipliers, for supplying said computation results from said input-stage adder/subtractors to said group of multipliers, respectively in accordance with predetermined switching rules;

a register for temporarily storing data; and a controller, coupled to said one-dimensional forward discrete cosine transform circuit and to said register, for controlling data transfer operation therebetween, wherein said controller transfers output data from said one-dimensional forward discrete cosine transform circuit to said register and provides said one-dimensional forward discrete cosine transform circuit with said transferred output data stored in said register as new input data.

12. An MPEG video encoder comprising a two-dimensional forward discrete cosine transform circuit according to claim 11.

13. The MPEC video encoder according to claim 12, wherein said group of output-stage adders includes at least two stage adders.

14. The circuit according to claim 11, wherein said group of output-stage adders includes at least two stage adders.

15. A two-dimensional forward discrete cosine transform circuit comprising:

a first one-dimensional forward discrete cosine transform circuit, said first one-dimensional circuit comprising:

a first group of input-stage adders/subtractors for receiving plural pieces of first input data externally supplied in parallel and for performing addition/subtraction on said first input data;

a first group of multipliers for receiving first computation results from said first group of input-stage adders/subtractors, each multiplier having a cosine constant to multiply with a particular one of said first computation results;

a first group of output-stage adders for receiving first multiplication results from said first group of multipliers and for adding said first multiplication results to produce first output data, said first output data being the results of said first one-dimensional forward discrete cosine transform of said first input data; and a first selector, provided between said first group of input-stage adders/subtractors and said first group of multipliers, for supplying said first computation results from said first group of input-stage adders/subtractors to said first group of multipliers, respectively, in accordance with predetermined switching rules;

a second one-dimensional forward discrete cosine transform circuit, said second one-dimensional circuit comprising:

a second group of input-stage adders/subtractors for receiving plural pieces of second input data externally supplied in parallel and for performing addition/subtraction on said second input data;

a second group of multipliers for receiving second computation results from said second group of input-stage adders/subtractors, each multiplier having a cosine constant to multiply with a particular one of said second computation results;

a second group of output-stage adders for receiving second multiplication results from said second group of multipliers and for adding said second multiplication results to produce second output data, said second output data being the results of said second one-dimensional forward discrete cosine transform of said second input data; and a second selector, provided between said second group of input-stage adders/subtractors and said second group of multipliers, for supplying said second computation results from said second group of input-stage adders/subtractors to said second group of multipliers, respectively, in accordance with predetermined switching rules;

a register for temporally storing said first output data from said first one-dimensional forward discrete cosine transform circuit; and data transfer control means for transferring said first output data stored in said register to said second one-dimensional forward discrete cosine transform circuit, as said second input data.

16. An MPEG video encoder comprising a two-dimensional forward discrete cosine transform circuit according to claim 15.

17. The MPEG video encoder according to claim 16, wherein each of said first and second groups of output-stage adders includes at least two stage adders.

18. The circuit according to claim 15, wherein each of said first and second groups of output-stage adders includes at least two stage adders.

19. The two-dimensional forward discrete cosine transform circuit according to claim 15, further comprising:

said adders/subtractors of each of said first group of input stage adders/subtractors and said second group of input-stage adders/subtractors producing plural pieces of said respective first and second computation results;

each of said first and second selectors being responsive to said predetermined switching rules for supplying selected ones of said respective pieces of said first and second computation results to respective predetermined ones of said multipliers of said respective first and second groups of multipliers.

20. A two dimensional inverse discrete cosine transform circuit comprising:

a one-dimensional inverse discrete cosine transform circuit, said one-dimensional circuit comprising:

a group of multipliers for receiving plural pieces of input data externally supplied in parallel, each multiplier having a cosine constant to multiply with received input data; and a group of adders/subtractors for receiving multiplication results from said multipliers and performing addition/subtraction thereon to produce output data, said output data being results of an inverse discrete cosine transform of said input data;

each of said multipliers being adapted to set a multiplication result to a positive value or a negative value in accordance with how said plural pieces of input data are distributed to said multipliers;

a register for temporally storing data; and a controller, coupled to said one-dimensional inverse discrete cosine transform circuit and to said register, for controlling data transfer operation therebetween, wherein said controller transfers output data from said one-dimensional inverse discrete cosine transform circuit to said register and provides said one-dimensional inverse discrete cosine transform circuit with said transferred output data stored in said register as new input data.

21. An MPEG video decoder comprising a two-dimensional inverse discrete cosine transform circuit according to claim 20.

22. The MPEG video encoder according to claim 21, wherein said group of adders/subtractors includes at least three stage adders/subtractors.

23. The circuit according to claim 20, wherein said group of adders/subtractors includes at least three stage adders/subtractors.

24. A two-dimensional inverse discrete cosine transform circuit comprising:

a first one-dimensional inverse discrete cosine transform circuit, said first one-dimensional circuit comprising;

a first group of multipliers for receiving plural pieces of first input data externally supplied in parallel, each of said multipliers having a cosine constant to multiply with said received first input data; and a first group of adders/subtractors for receiving first multiplication results from said first group of multipliers and performing addition/subtraction thereon to produce first output data, said first output data being the results of an inverse discrete cosine transform of said first input data;

each of said multipliers of said first group of multipliers being adapted to set ones of said first multiplication results to a positive value or a negative value in accordance with how said plural pieces of first input data are distributed to said first group of multipliers;

a second one-dimensional inverse discrete cosine transform circuit, said second one-dimensional circuit comprising:

a second group of multipliers for receiving plural pieces of second input data externally supplied in parallel, each of said multipliers having a cosine constant to multiply with received second input data; and a second group of adders/subtractors for receiving second multiplication results from said second group of multipliers and performing addition/subtraction thereon to produce second output data, said second output data being the results of an inverse discrete cosine transform of said second input data;

each of said second group of multipliers being adapted to set ones of said second multiplication results to a positive value or a negative value in accordance with how said plural pieces of second input data are distributed to said second group of multipliers;

a register for temporarily storing said first output data from said first one-dimensional inverse discrete cosine transform circuit; and data transfer control means for transferring said first output data stored in said register to said second one-dimensional inverse discrete cosine transform circuit, as said second input data.

25. An MPEG video decoder comprising a two-dimensional inverse discrete cosine transform circuit according to claim 24.

26. The MPEG video encoder according to claim 25, wherein each of said first and second groups of adders/subtractors includes at least three stage adders/subtractors.

27. The circuit according to claim 24, wherein each of said first and second groups of adders/subtractors includes at least three stage adders/subtractors.

* * * * *